(12) United States Patent
Mohamed et al.

(10) Patent No.: US 9,987,937 B1
(45) Date of Patent: Jun. 5, 2018

(54) AUTONOMOUS TWO-LAYER PREDICTIVE CONTROLLER FOR BIDIRECTIONAL INDUCTIVE POWER TRANSFER IN EV APPLICATIONS

(71) Applicants: Ahmed A. S. Mohamed, Miami, FL (US); Osama A. Mohammed, Miami, FL (US)

(72) Inventors: Ahmed A. S. Mohamed, Miami, FL (US); Osama A. Mohammed, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days. days.

(21) Appl. No.: 15/848,470

(22) Filed: Dec. 20, 2017

(51) Int. Cl.
| | |
|---|---|
| *B60L 11/18* | (2006.01) |
| *H02J 50/12* | (2016.01) |
| *H02J 7/02* | (2016.01) |
| *H02M 3/335* | (2006.01) |
| *H02J 50/80* | (2016.01) |

(Continued)

(52) U.S. Cl.
CPC .......... *B60L 11/182* (2013.01); *H02J 7/025* (2013.01); *H02J 50/12* (2016.02); *H02J 50/80* (2016.02); *H02M 3/33584* (2013.01); *H02M 3/33592* (2013.01); *H02M 7/797* (2013.01); *B60L 2210/40* (2013.01); *H02J 2007/0098* (2013.01)

(58) Field of Classification Search
CPC .......... B60L 11/182; B60L 2210/40; H02M 3/33592; H02M 7/797; H02M 3/33584; H02J 50/80; H02J 7/025; H02J 50/12; H02J 2007/0098
See application file for complete search history.

(56) References Cited

U.S. PATENT DOCUMENTS

| | | | | |
|---|---|---|---|---|
| 5,065,303 A | * | 11/1991 | Nguyen ................. | H02M 7/49 363/40 |
| 8,525,370 B2 | * | 9/2013 | Walley .................... | H02J 5/005 307/104 |
| 9,331,601 B2 | * | 5/2016 | Park .................... | H02M 7/5395 |

(Continued)

OTHER PUBLICATIONS

Neath et al., "An optimal PID controller for a bidirectional inductive power transfer system using multiobjective genetic algorithm," IEEE Transactions on Power Electronics, Mar. 2014, pp. 1523-1531, vol. 29, No. 3.

(Continued)

*Primary Examiner* — Jared Fureman
*Assistant Examiner* — Michael Warmflash
(74) *Attorney, Agent, or Firm* — Saliwanchik, Lloyd & Eisenschenk

(57) ABSTRACT

A two layer predictive controller for bidirectional inductive power transfer can include: a first layer controller generating a mutual inductance and a reference active power; and a second layer controller receiving the mutual inductance and the reference active power, and generating a primary phase shift, a secondary phase shift, and a differential phase shift; the primary phase shift configured to manage a magnitude of an output voltage of a primary inverter; the secondary phase shift configured to manage a magnitude of an output voltage of a secondary inverter; and the differential phase shift being a phase difference between the output voltage of the primary inverter and the output voltage of the secondary inverter.

20 Claims, 9 Drawing Sheets

(51) Int. Cl.
*H02M 7/797* (2006.01)
*H02J 7/00* (2006.01)

(56) References Cited

U.S. PATENT DOCUMENTS

| | | | |
|---|---|---|---|
| 9,731,614 B1* | 8/2017 | Sarwat | B60L 11/1829 |
| 9,919,610 B1* | 3/2018 | Sarwat | B60L 11/182 |
| 2010/0148723 A1* | 6/2010 | Cook | G06K 7/0008 320/108 |
| 2011/0254379 A1* | 10/2011 | Madawala | H02J 5/005 307/104 |
| 2015/0001958 A1* | 1/2015 | Abe | H02J 5/005 307/104 |
| 2015/0207335 A1* | 7/2015 | Madawala | B60L 11/182 307/104 |
| 2017/0229918 A1* | 8/2017 | Madawala | H02J 50/12 |
| 2017/0323721 A1* | 11/2017 | Madawala | H02J 5/005 |

OTHER PUBLICATIONS

Thirugnanam et al., "Modeling and control of contactless based smart charging station in V2G scenario," IEEE Transactions on Smart Grid, Jan. 2014, pp. 1-12.

Ou et al., "Investigating wireless charging and mobility of electric vehicles on electricity market," IEEE Transactions on Industrial Electronics, May 2015, pp. 1-11.

* cited by examiner (a) Figure 5(a)

(b) Figure 5(b)

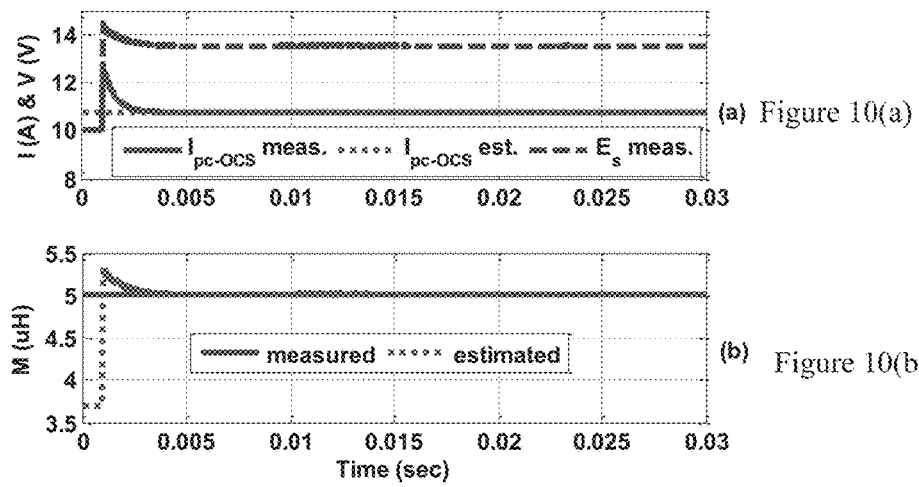
(a) Figure 10(a)
(b) Figure 10(b)
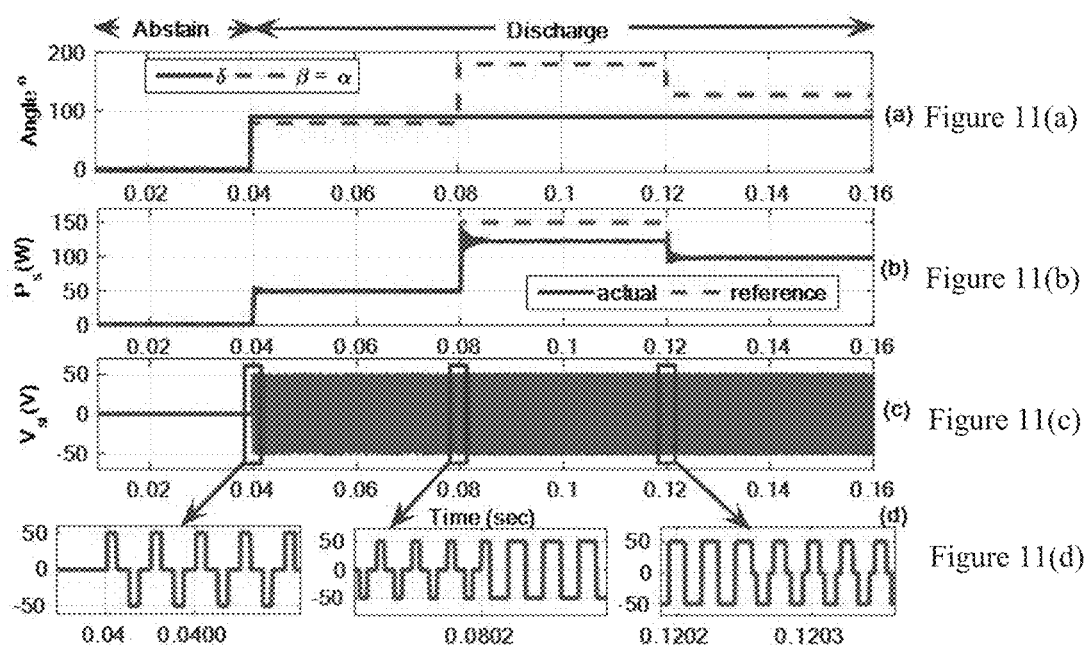
(a) Figure 11(a)
(b) Figure 11(b)
(c) Figure 11(c)
(d) Figure 11(d)

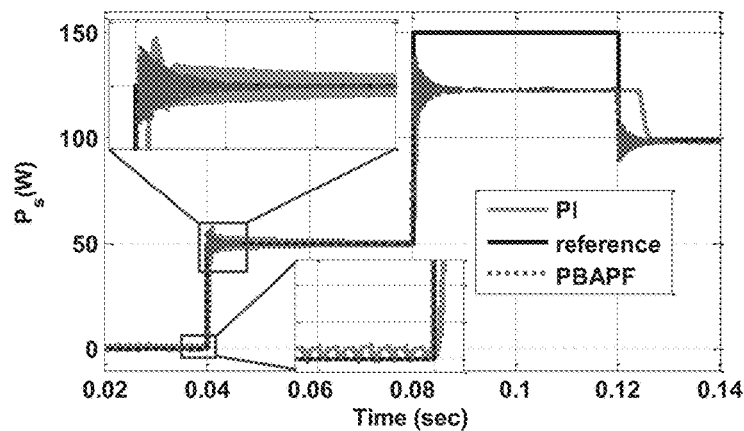
Figure 12
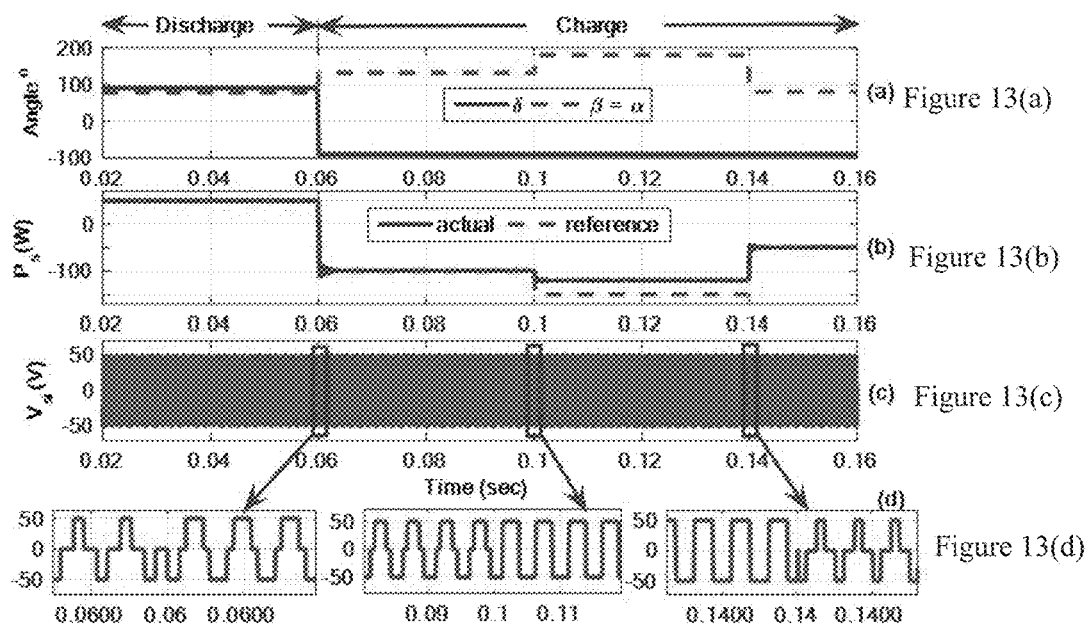
(a) Figure 13(a)
(b) Figure 13(b)
(c) Figure 13(c)
(d) Figure 13(d)

AUTONOMOUS TWO-LAYER PREDICTIVE CONTROLLER FOR BIDIRECTIONAL INDUCTIVE POWER TRANSFER IN EV APPLICATIONS

BACKGROUND

Different types of controls have been considered for driving the modulation variable, such as classical proportional-integral (PI) ([1], [2]), proportional-integral-derivative (PID) ([3]), and fuzzy logic ([4]). Most of these controllers are designed for unidirectional operation and wouldn't be appropriate for bidirectional applications such as vehicle-to-grid and grid-to-vehicle. Classical PI and PID controllers suffer from settling time, overshoots, and oscillations, and the controllers do not resist the uncertainties and disturbances. These controllers also show inaccurate operation due to the high frequency operation and the large level of harmonics. Fuzzy controllers are more robust, but they present high computational processing time and effort, especially in high frequency applications. All the existing systems comprise one layer control that follows fixed reference power-flow rate. They do not work independently, so a supervisory controller is necessary. The misalignment impact is not considered in these controllers, which leads to inaccurate performance.

BRIEF SUMMARY

Embodiments of the subject invention provide novel and advantageous two layer predictive controllers that comprise a first layer controller responsible for communicating with the surrounding infrastructures and a second layer controller receiving a reference signal from the first layer controller and predicting control parameters for the resonant converters, thereby allowing an electric vehicle (EV) to interact with the surrounding infrastructures and to take its own decision to charge, discharge, or abstain.

In an embodiment, a two layer predictive controller for bidirectional inductive power transfer can comprise: a first layer controller generating a mutual inductance and a reference active power; and a second layer controller receiving the mutual inductance and the reference active power, and generating a primary phase shift, a secondary phase shift, and a differential phase shift; the primary phase shift configured to manage a magnitude of an output voltage of a primary inverter; the secondary phase shift configured to manage a magnitude of an output voltage of a secondary inverter; and the differential phase shift being a phase difference between the output voltage of the primary inverter and the output voltage of the secondary inverter.

In another embodiment, a two layer predictive controller for bidirectional inductive power transfer can comprise: a first layer controller generating a mutual inductance and a reference active power; a second layer controller receiving the mutual inductance and the reference active power, and generating a primary phase shift, a secondary phase shift, and a differential phase shift; and a secondary pulse-phase modulator receiving the secondary phase shift and the differential phase shift, and generating a secondary switching signal for a secondary inverter of a secondary side circuit; the mutual inductance estimated by the first layer controller based on a primary coil current of a primary side circuit and an open circuit voltage of the secondary side circuit, the primary phase shift configured to manage a magnitude of an output voltage of a primary inverter of the primary side circuit, the secondary phase shift configured to manage a magnitude of an output voltage of the secondary inverter, and the differential phase shift being a phase difference between the output voltage of the primary inverter and the output voltage of the secondary inverter.

In yet another embodiment, a two layer predictive controller system for bidirectional inductive power transfer can comprise: a primary inverter; a secondary inverter; a wireless coupler coupling the primary inverter and the secondary inverter such that inductive power transfers bidirectionally between the primary inverter and the secondary inverter; a first layer controller generating a mutual inductance of the wireless coupler and a reference active power; a second layer controller receiving the mutual inductance and the reference active power, and generating a primary phase shift, a secondary phase shift, and a differential phase shift; a secondary pulse-phase modulator receiving the secondary phase shift and the differential phase shift, and generating a secondary switching signal; a secondary driver receiving the secondary switching signal, boosting the secondary switching signal, and providing the boosted secondary switching signal to the secondary inverter; a secondary communication gateway receiving the primary phase shift from the second layer controller through the first layer controller; a primary communication gateway receiving the primary phase shift from the secondary communication gateway through wireless communication; a primary pulse-phase modulator receiving the primary phase shift from the primary communication gateway and generating a primary switching signal for a primary inverter; and a primary driver receiving the primary switching signal, boosting the primary switching signal, and providing the boosted primary switching signal to the primary inverter, the primary phase shift configured to manage a magnitude of an output voltage of the primary inverter, the secondary phase shift configured to manage a magnitude of an output voltage of the secondary inverter, the differential phase shift being a phase difference between the output voltage of the primary inverter and the output voltage of the secondary inverter, and the second layer controller setting the differential phase shift at zero such that there is no power transfer between the primary side circuit and the secondary side circuit when the reference active power is zero; the second layer controller setting the differential phase shift at $-90°$ for maximum power charging when the reference active power is negative; the second layer controller setting the differential phase shift at $-\delta_{Q0}°$ for unity power factor charging when the reference active power is negative; the second layer controller setting the differential phase shift at $90°$ for maximum power discharging when the reference active power is positive; and the second layer controller setting the differential phase shift at $\delta_{Q0}°$ for unity power factor discharging when the reference active power is positive.

BRIEF DESCRIPTION OF DRAWINGS

FIG. 10(a) shows an open circuit voltage of a secondary side circuit and a primary coil current of a primary side circuit.

FIG. 10(b) shows an estimated mutual inductance and a measured mutual inductance.

FIG. 11(a) shows control parameters of a two layer predictive controller under Abstain and Discharge according to an embodiment of the subject invention.

FIG. 11(b) shows secondary power of a two layer predictive controller under Abstain and Discharge according to an embodiment of the subject invention.

FIG. 11(c) shows secondary voltage of a two layer predictive controller under Abstain and Discharge according to an embodiment of the subject invention.

FIG. 11(d) shows enlarged secondary voltage of a two layer predictive controller under Abstain and Discharge according to an embodiment of the subject invention.

FIG. 12 shows comparison between a proportional-integral (PI) controller and a two layer predictive controller under Abstain and Discharge.

FIG. 13(a) shows control parameters of a two layer predictive controller under Discharge and Charge according to an embodiment of the subject invention.

FIG. 13(b) shows secondary power of a two layer predictive controller under Discharge and Charge according to an embodiment of the subject invention.

FIG. 13(c) shows secondary voltage of a two layer predictive controller under Discharge and Charge according to an embodiment of the subject invention.

FIG. 13(d) shows enlarged secondary voltage of a two layer predictive controller under Discharge and Charge according to an embodiment of the subject invention.

DETAILED DESCRIPTION

Embodiments of the subject invention provide novel and advantageous two layer predictive controllers that comprise a first layer controller responsible for communicating with the surrounding infrastructures and a second layer controller receiving a reference signal from the first layer controller and predicting control parameters for the resonant converters, thereby allowing an electric vehicle (EV) to interact with the surrounding infrastructures and to take its own decision to charge, discharge, or abstain.

Embodiments of the subject invention provide a comprehensive solution that allows the EV to autonomously charge and discharge its battery wirelessly during long term parking and/or the transient stops. Embodiments provide new two layer predictive bidirectional power flow (PBPF) controllers for wireless power transfer system in EV applications. The two layer PBPF controller is able to manage the bidirectional power flow between the EV and surrounding infrastructures such as power grid, home micro-grid, building micro-grid, road, or another vehicle.

Figure 1:
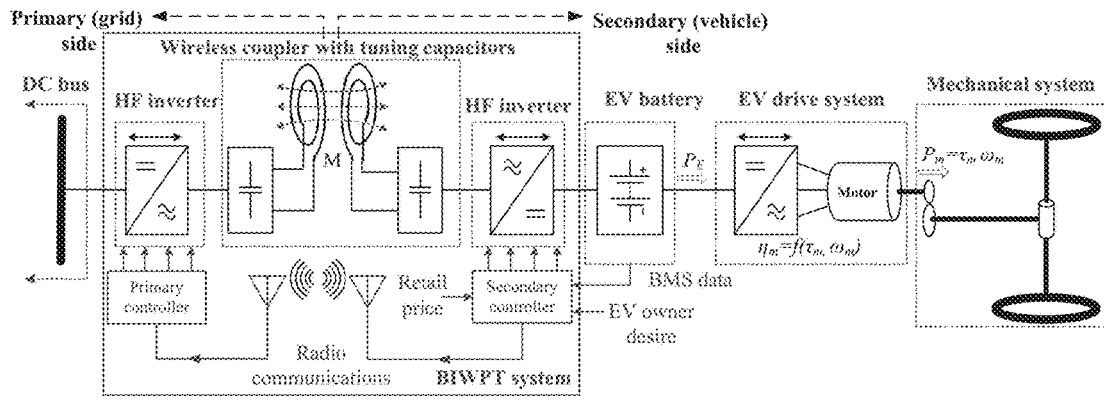
FIG. 1 shows a block diagram of an electric vehicle (EV) power-train connected with a bidirectional inductive wireless power transfer (BIWPT) system.

FIG. 1 shows a block diagram of an electric vehicle (EV) power-train connected with a bidirectional inductive wireless power transfer system (BIWPTS). The EV power-train system comprises a bidirectional inductive wireless power transfer system (BIWPTS), an EV battery, an EV drive system, and mechanical parts. The BIWPTS has two electrically isolated sides: the primary (grid, ground, or transmitter) and the secondary (vehicle or receiver) side. The two sides communicate with each other through radio communication. The BIWPTS is a dual active system based on full or half bridge inverter on each side to support the bidirectional power flow between the EV and the power grid to be able to charge and discharge the EV. The charging (grid-to-vehicle (G2V)) process is necessary for driving performance and enables the EV to reach its destination. The discharging operation is useful to support the power grid (vehicle-to-grid (V2G)) and get the benefits for the stored energy inside the EV during idle situation. In the BIWPTS, the power transfers between the primary and secondary sides through large air-gap by magnetic induction while the system operating at resonance conditions. The energy transfer operation may occur while the EV is in long-term parking space such as parking garage, charging station, public parking or private parking (stationary IPT). Also, it can happen during the transient stops such as bus stops for electric buses or a stop for traffic signals (quasi-dynamic WPT). It can also happen during the movement (dynamic WPT).

Figure 2:
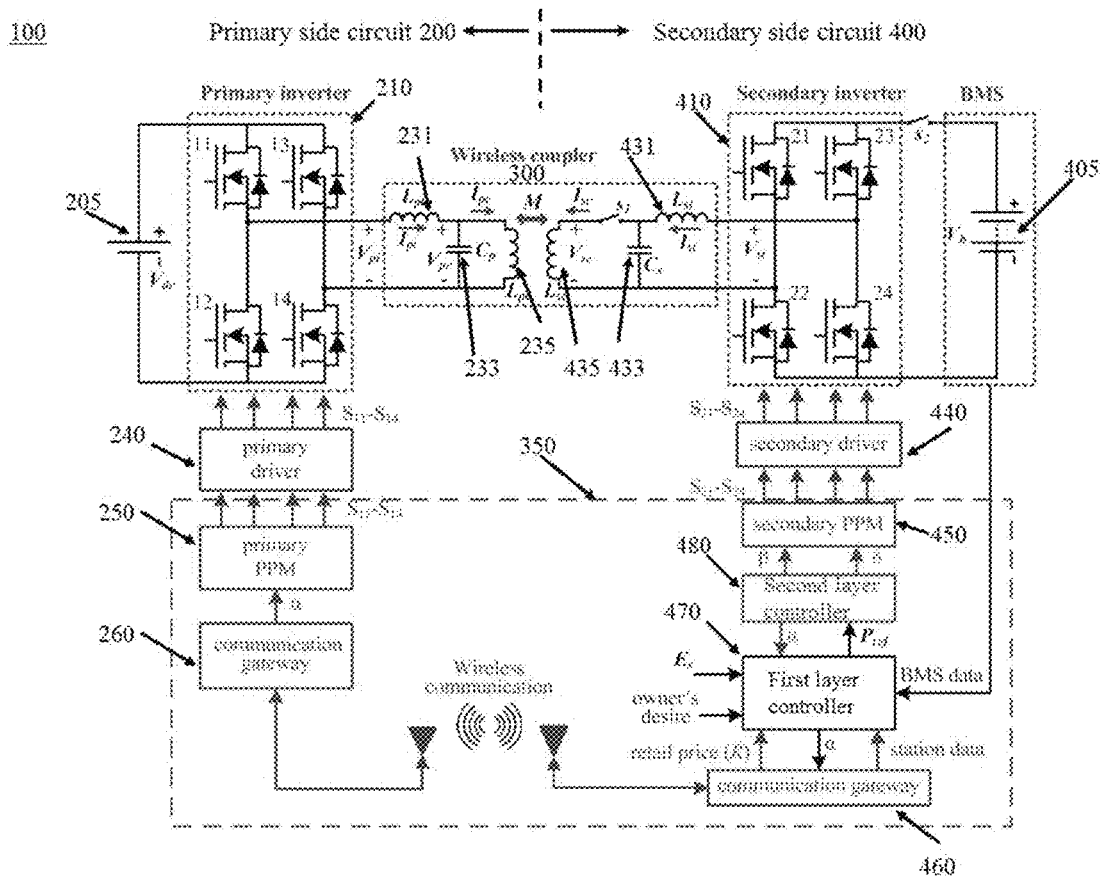
FIG. 2 shows a two layer predictive controller in the BIWPT system according to an embodiment of the subject invention.

The power flow between the two sides can be managed by the controller which is placed on the vehicle side. In an embodiment, two control layers can be used in the system, as shown in FIG. 2. FIG. 2 shows a two layer predictive controller in the BIWPTS according to an embodiment of the subject invention. The first control layer is gathering data from the battery management system (BMS), EV's operator, the charging station and the power grid. Then, it decides the mode of operation (discharge (V2G), charge (G2V) or abstain) and estimates the required rate of discharge or charge. The outcomes from this layer are passed to the second layer PBPF control. This controller predicts the pulse-phase modulation (PPM) parameters for both the primary and secondary sides, which are responsible for generating the switching activities of the two resonant inverters (primary and secondary). The generated signals are boosted through the driving circuits to the gate voltage and power level of the power semiconductor switch.

The BIWPTS of an embodiment of the subject invention comprises two levels of control. The first layer is responsible for communicating with the surrounding infrastructures and gathering information from driver, charging station, power grid, and battery management system. Then, based on these information, it takes the decision to charge, discharge or abstain, and estimate the rate of charge or discharge. The second layer receives the reference signal from the first layer and predicts the control parameters for the two resonant converters (one is in the vehicle side (secondary side) and the other is in the grid side (primary side)) to achieve the required power-flow.

This two layer controller offers intelligent autonomous performance that satisfies both the EV's operator and power grid operator. It guarantees the best driving performance with the minimum consumption cost and minimum side effect on the power grid. It estimates EV psychological price as a function of its battery state of charge (SOC) and compares it with the energy price to decide whether to charge, discharge or abstain, and how much the charging or discharging rate is.

It exists on the vehicle side to allow the autonomous operation so the EV can charge and discharge independently without the need of centralized controller on houses, parking garage, public parking or traffic signal. The controller adaptively estimates the system parameters to consider the misalignment and the environmental conditions effects on the system performance. The parameter estimation is achieved using only one voltage sensor.

The second layer controller is designed based on a new analytical modeling for the BIWPT system. It provides very fast and stable response during both the transient and steady state operation in stationary and quasi-dynamic wireless power transfer operation.

Referring to FIGS. 1 and 2, a two layer predictive controller system 100 for bidirectional inductive power transfer comprises a primary side circuit 200 and a secondary side circuit 400. The primary side circuit 200 and the secondary side circuit 400 can transfer power bidirectionally by using inductive coupling. The primary side circuit 200 can be a facility including power grid, home micro-grid, building micro-grid, road, and other vehicle, and the secondary side circuit 400 can be a vehicle. While the primary side circuit 200 connected to DC bus generally provides power to the second side circuit 400 installed in the vehicle, the two layer predictive controller system 100 enables the second side circuit 400 to provide power to the primary side circuit 200, thereby implementing bidirectional power transfer.

The primary side circuit 200 comprises a primary inverter 210 receiving a power from a DC bus 205, a primary power pad 235 for wireless coupling, a primary compensation capacitor 233 for tuning of the wireless coupling, and a primary filter 231 connected between the primary inverter 210 and the primary power pad 235. Similarly, the secondary side circuit 400 comprises a secondary inverter 410 providing a power to a battery 405, a secondary power pad 435 for the wireless coupling, a secondary compensation capacitor 433 for tuning of the wireless coupling, and a secondary filter 431 connected between the secondary inverter 410 and the secondary power pad 435. The primary power pad 235 faces the secondary power pad 435, thereby the combination of the primary filter 231, the primary compensation capacitor 233, the primary power pad 235, the secondary filter 431, the secondary compensation capacitor 433, and the secondary power pad 435 functions as a wireless coupler 300.

Each of the primary inverter 210 and the secondary inverter 410 is a high frequency H-bridge converter (HF-HBC). However, each of the primary inverter 210 and the secondary inverter 410 is not limited to a particular inverter but can be implemented by different inverters including a full bridge inverter or a half bridge inverter. In addition, the primary inverter 210 and the secondary inverter 410 are controlled by a primary driver 240 and a secondary driver 440, respectively. That is, the primary driver 240 provides primary switching signals $S_{11}$-$S_{14}$ for primary switches 11-14, and the secondary driver 440 provides secondary switching signals $S_{21}$-$S_{24}$ for secondary switches 21-24.

The two layer predictive controller system 100 further comprises a two layer predictive controller 350 controlling the primary inverter 210 and the secondary inverter 410. The two layer predictive controller 350 comprises a first layer controller 470 and a second layer controller 480. The first layer controller 470 receives a battery management system (BMS) data, an EV's operator's desire, and an open circuit voltage $E_s$ of the secondary side circuit 400 and provides a mutual inductance M and a reference active power $P_{ref}$ to the second layer controller 480. The second layer controller 480 generates a primary phase shift α, a secondary phase shift β, and a differential phase shift δ based on the mutual inductance M and the reference active power $P_{ref}$.

The secondary pulse-phase modulator (PPM) 450 performing pulse-phase modulation generates the secondary switching signals $S_{21}$-$S_{24}$ based on the secondary phase shift β and the differential phase shift δ, and provides the secondary switching signals $S_{21}$-$S_{24}$ to the secondary driver 440. The secondary switching signals $S_{21}$-$S_{24}$ are boosted by the secondary driver 440 to a required gate voltage and power level such that the boosted secondary switching signals $S_{21}$-$S_{24}$ sufficiently drive the semiconductor secondary switches 21-24.

The two layer predictive controller 350 further comprises a primary communication gateway 260 and a secondary communication gateway 460 for wireless communication between the primary side circuit 200 and the secondary side circuit 400. In addition, the primary phase shift α generated in the secondary layer controller 480 passes the first layer controller 470 and then is transferred to a primary PPM 250 through the primary 260 and secondary 460 communication gateways. The primary PPM 250 generates the primary switching signals $S_{11}$-$S_{14}$ based on the primary phase shift α, and the primary driver 240 provides the boosted primary switching signals $S_{11}$-$S_{14}$ to the primary inverter 210. While the secondary PPM 450, the secondary communication gateway 460, the first layer controller 470, and the second layer controller 480 are installed in the EV, the primary PPM 250 and the primary communication gateway 260 are not installed in the same EV but can be installed in other vehicle or the grid side.

Figure 3:
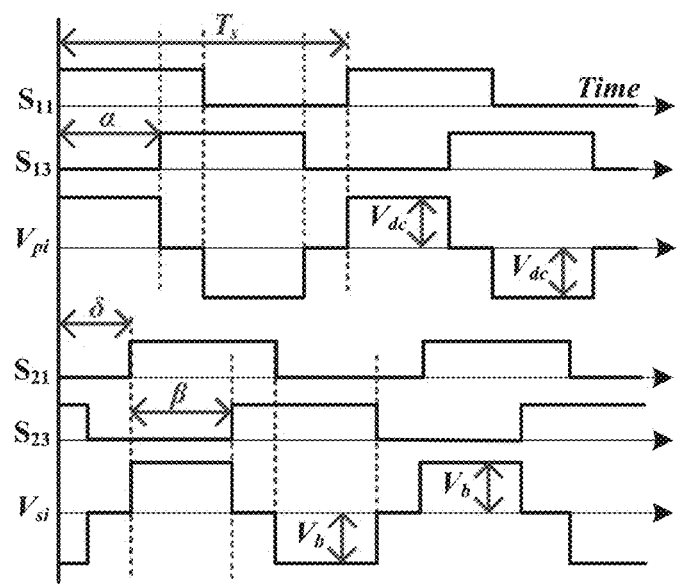
FIG. 3 shows phase shift control parameters of a two layer predictive controller with respect to the inverter output voltages.

The switching activities of the HF inverters, such as the primary inverter 210 and the secondary inverter 410 are controlled based on PPM technique. In this technique, the system currents and power are managed by adjusting both the phase shift between leg voltages for the same inverter and the two inverter voltages. The controller of the embodiment generates the primary phase shift α between the two primary inverter legs, in which a first primary inverter leg includes a first primary switch 11 and a second primary switch 12, and a second primary inverter leg includes a third primary switch 13 and a fourth primary switch 14. This parameter (α) is used to adjust the magnitude of the primary inverter output voltage. The controller produces the secondary phase shift β between the two secondary inverter legs which is utilized to modify the magnitude of the secondary inverter output voltage, wherein a first secondary inverter leg includes a first secondary switch 21 and a second secondary switch 22, and a second secondary inverter leg includes a third secondary switch 23 and a fourth secondary switch 24. These two parameters (α and β) are used to manage the magnitude of the power flow between the primary and secondary sides. They vary from zero to 180°. Zero means zero power transfer and 180° leads to maximum power flow. The controller also generates the differential phase shift δ between the primary and secondary inverter output voltages. This parameter (δ) is responsible for the direction of the power flow (G2V or V2G). It also can be used to manage the type of injected power (active or reactive). For active power flow, δ is set ±90° to provide the maximum active power, or ±90° or ±$\delta_{Q0}$° (given in Equation 3) to provide unity power factor operation. The negative sign is used during G2V service, while the positive sign is considered during V2G operation. The definition of these parameters and their relation with the inverter output voltage is indicated in FIG. 3. FIG. 3 shows phase shift control parameters of a two layer predictive controller with respect to the inverter output voltages. The phase shift parameters ($\alpha$, $\beta$ and $\delta$) are then translated to switching signals based on the pulse-phase modulation (PPM) technique as indicated in FIG. 3. These parameters are adjusted by the two-layer PBPF controller to drive the magnitude and the direction of the power flow in the system.

Figure 4:
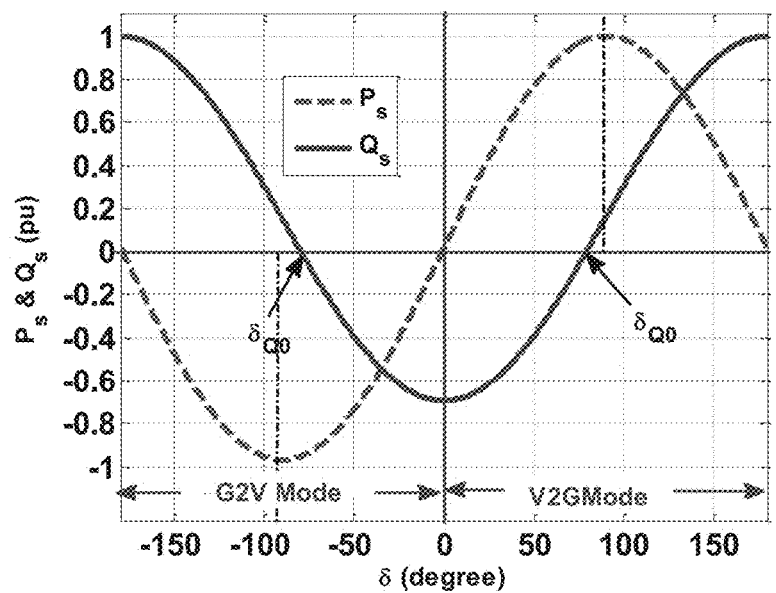
FIG. 4 shows active and reactive power flow of the BIWPT system with respect to the differential phase shift control parameter.

The controller according to an embodiment of the subject invention is located on the vehicle side to control the magnitude and the direction of the power flow between EV and other resources. The power flow control is achieved using the primary and the secondary inverters. In the embodiment of the subject invention, it is assumed that both inverters will be driven by the same PPM parameter (i.e. $\alpha=\beta$) to control the active power flow magnitude. Based on BIWPTS secondary power model given in Equations (1) and (2) and analyzed in FIG. 4, it can be seen that the power flow operation in V2G and G2V modes is unsymmetrical. This is because of the resistive losses effect which is fixed regardless the power flow direction. FIG. 4 shows phase shift control parameters of a two layer predictive controller. Referring to FIG. 4, the angle ($\delta$) at which the system operates at unity power factor (UPF) (zero reactive power) is no longer ±90°. It can be observed that, at ±90°, the system provides the maximum power (MP) but the power factor is less than unity. The value of $\delta$ at which the system shows UPF operation ($\delta_{Q0}$) is calculated using Equation (3).

$$P_s = \left(\frac{8}{\pi^2}\right)\left[\frac{M\gamma V_{dc} V_b}{\omega_r L_{pi} L_{si}}\sin\left(\frac{\alpha}{2}\right)\sin\left(\frac{\beta}{2}\right)\sin(\delta) + \frac{C_s R_{si} V_b^2}{L_{sc} + C_s R_{si}^2}\sin^2\left(\frac{\beta}{2}\right)\right] \quad (1)$$

$$Q_s = \left(\frac{8}{\pi^2}\right)\left[\frac{-M\gamma V_{dc} V_b}{\omega_r L_{pi} L_{si}}\sin\left(\frac{\alpha}{2}\right)\sin\left(\frac{\beta}{2}\right)\cos(\delta) + \frac{V_b^2}{\omega_r L_{si}}\left(\frac{1}{3^3}\sin^2\left(\frac{3\beta}{2}\right) + \frac{1}{5^3}\sin^2\left(\frac{5\beta}{2}\right)\right)\right] \quad (2)$$

$$\delta_{Q0} = \cos^{-1}\left(\frac{L_{pi} V_b\left[0.037\sin^2\left(\frac{3\beta}{2}\right) + 0.008\sin^2\left(\frac{5\beta}{2}\right)\right]}{M\gamma V_{dc}\sin\left(\frac{\alpha}{2}\right)\sin\left(\frac{\beta}{2}\right)}\right) \quad (3)$$

where, the subscript 'p' stands for the primary side and 's' stands for the secondary circuit, $L_{pi}$ and $L_{si}$ are the filter inductances of the primary filter 231 and the secondary filter 431, $L_{pc}$ and $L_{sc}$ are the pad self-inductances of the primary power pad 235 and the secondary power pad 435, $C_p$ and $C_s$ are the compensation capacitances of the primary compensation capacitor 233 and the secondary compensation capacitor 433, $\omega_r$ is the resonant frequency that is chosen based on the self-inductance of the coupler coils to be independent on the misalignment between the two sides during the operation, M is the mutual inductance, $V_b$ is the battery voltage, $V_{dc}$ is the DC bus voltage, and $\gamma$ is a real number which is very close to unity and is given as $$\gamma = \frac{L_{pi} L_{si}}{(L_{pi} + C_p R_{pc} R_{pi})(L_{si} + C_s R_{sc} R_{si}) + \omega_r^2 M^2 C_p R_{pi} R_{si}}.$$

Thus, the parameter $\delta$ is assigned based on the operator priority which can be power magnitude or power factor. Keeping $\delta=\pm 90°$ will achieve maximum power (MP) operation while, putting $\delta=\pm\delta_{Q0}$ will accomplish UPF operation (G2V when $\delta=-$ve and V2G when $\delta=+$ve). Based on the previous assumptions, the control parameters ($\alpha$ and $\beta$) are predicted using Equation (4).

$$\alpha = \beta = \cos^{-1}(1 - (2P_{ref}/P_{max})); \quad (4)$$

$$P_{max} = \left(\frac{8}{\pi^2}\right)\frac{M\gamma V_{dc} V_b}{\omega_r L_{pi} L_{si}}\sin(\delta) + \left(\frac{8}{\pi^2}\right)\frac{C_s R_{si} V_b^2}{L_{sc} + C_s R_{si}^2}$$

where, $P_{ref}$ is the desired reference active power which is estimated by the first layer controller 470 and passed to the second layer controller 480.

For prediction purposes, the system design parameters need to be known. The BIWPTS under consideration is designed for fixed resonant frequency ($\omega_r$) operation in both the primary and secondary sides. Also, the compensation capacitors ($C_p$, $C_s$) are tuned to resonate with the self-inductance of the coils ($L_{pc}$, $L_{sc}$) which are known after the design and are relatively fixed. Therefore, the compensation capacitors are fixed as well. Under these constraints, only the mutual inductance (M) varies in light of the vehicle position and the misalignment between the wireless pads including the primary power pad 235 and the secondary power pad 435. Thus, this parameter is adaptively estimated before applying the control. The embodiment of the subject invention provides an effective real-time mutual inductance estimation technique. It depends on utilizing the analytical model besides one direct measurement. A known value for the primary control parameter ($\alpha$) is applied while the secondary side circuit 400 being open circuited. The open circuit voltage $E_s$ of the secondary side circuit 400 is measured and the primary coil current $I_{pc\_OCS}$ and the mutual inductance M are estimated based on (5).

$$I_{pc\_OCS} = -jV_{pi\_1}/[\omega_r(L_{pc}+C_p R_{pc} R_{pi})]; M = E_s/(\omega_r I_{pc\_OCS}) \quad (5)$$

Figure 5:
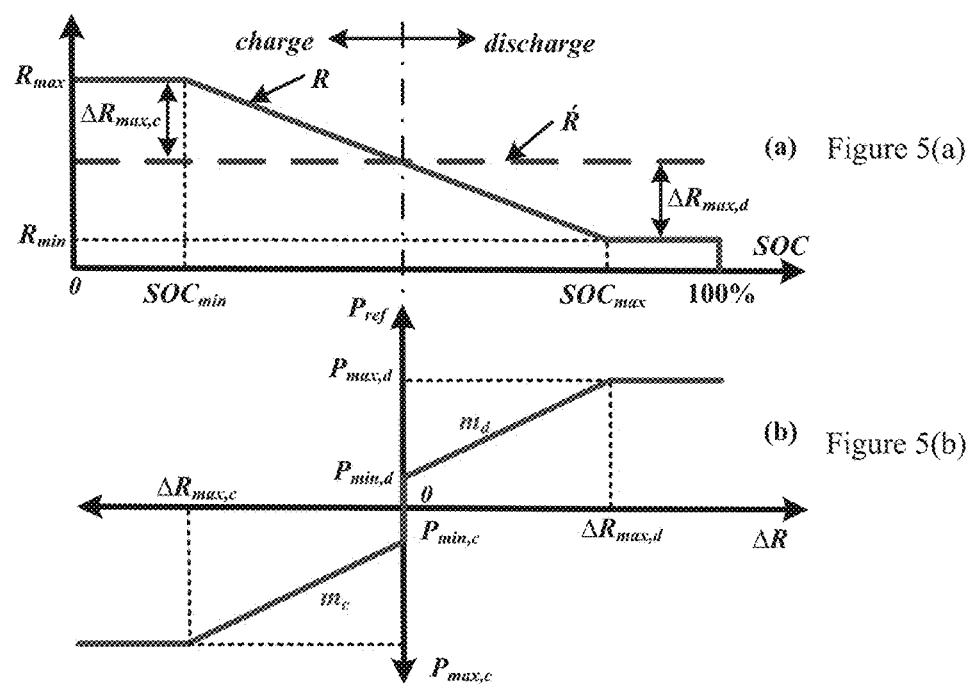
FIG. 5(a) shows a principle of a first layer controller based on an EV psychological price, a grid retail price, and an State of Charge (SOC).
FIG. 5(b) shows a reference active power of a first layer controller with respect to a cost benefit based on an EV psychological price and a grid retail price.

Referring to FIGS. 1-4, the first layer controller 470 receives the battery management system (BMS) data, EV's owner desire, and the open circuit voltage $E_s$ measurement directly from the same side. Also, it receives information about the grid retail price $\dot{R}$ and the charging station through the wireless communication link accomplished by the primary communication gateway 260 and the secondary communication gateway 460. Based on these data, the first layer controller 470 generates the reference active power $P_{ref}$ and passes it to the second layer controller 480. The charging and discharging decision and rate are defined by comparing the EV psychological price R with the grid retail price $\dot{R}$ of the wireless charging. The EV psychological price depends on its SOC, and is defined based on the first order polynomial cost function, as indicated in FIG. 5(a) and equation (6).

$$R = \frac{R_{min} - R_{max}}{SOC_{max} - SOC_{min}}SOC + R_{max} + \frac{R_{max} - R_{min}}{SOC_{max} - SOC_{min}}SOC_{min} \quad (6)$$

where, $SOC_{min}$ and $SOC_{max}$ are the limits of the linear operating region of the EV battery 405 which is typically 20-80%, $R_{min}$ and $R_{max}$ are the limits of EV psychological price which are chosen to cover the range of variation of the wireless charger retail price changes (R̂), as depicted in FIG. 5(*a*). The retail price for wireless charging of a road is available for the EV operators based on the current traffic information systems of Intelligent Transportation Systems (ITS). The charging and discharging benefit is evaluated as $\Delta R = \hat{R} - R$. The reference power flow direction and rate ($P_{ref}$) is assessed in terms of $\Delta R$, as described in FIG. 5(*b*) and equation (7).

$$P_{ref} = \begin{cases} P_{max,d} & \Delta R \geq \Delta R_{max,d} \\ m_d \Delta R + k_d & 0 < \Delta R < \Delta R_{max,d} \\ m_c \Delta R + k_c & \Delta R_{max,c} < \Delta R \leq 0 \\ P_{max,c} & \Delta R \leq \Delta R_{max,c} \end{cases} \quad (7)$$

where, $$m_d = \frac{P_{max,d} - P_{min,d}}{\Delta R_{max,d}}, k_d = P_{min,d},$$

$$m_c = \frac{P_{max,c} - P_{min,c}}{\Delta R_{max,c}}, k_c = P_{min,c}, P_{max,c} \text{ and } P_{max,d}$$

are estimated from (4) at $\alpha = \beta = 180°$, and $P_{min,c}$ and $P_{min,d}$ are defined based on the EV's battery manufactures and charging limits.

Over $SOC_{max}$, the benefit becomes maximum ($\Delta R_{max,d} = \hat{R} - R_{min}$), and the EV will discharge at the limit ($P_{max,d}$) in order to avoid overcharging. Below $SOC_{min}$, EV will keep charging at the maximum capacity ($P_{max,c}$) to help the vehicle to reach its destination. In this case, the benefit is maximum with negative sign ($\Delta R_{max,c} = \hat{R} - R_{mmax}$). When the two prices (R̂ and R) match, i.e. $\Delta R = 0$, the EV will charge at the minimum limit ($P_{min,c}$). When $\Delta R$ lies between 0 and $\Delta R_{max,d}$, the EV discharges following a linear line with slop $m_d$. When $\Delta R$ ranges between 0 and $\Delta R_{max,c}$, the EV charges linearly with slop $m_c$.

If the EV's driver has some restrictions during the integration with the grid, the first layer controller 470 allows him/her to introduce the limitations in terms of required SOC ($SOC_f$), connection time ($t_c$) and required operation (Mode). Then, it calculates the required rate ($P_{res}$) to satisfy these limitations using (8).

$$P_{res} = \mp \frac{SOC_f \cdot Q_n}{\eta \cdot t_c} \quad (8)$$

where, $Q_n$ is the nominal EV battery capacity and $\eta$ is the charging and discharging efficiency.

The first layer controller 470 considers the EV's driver desire by giving the ability to choose between 5 different modes of operation: Mode I: abstain (no interaction), Mode II: restricted operation by manually entering Mode, $SOC_f$ and $t_c$, Mode III: charge only without considering the grid price, Mode IV: charge only with considering the grid price, and Mode V: interact (charge and discharge based on the grid price and EV psychological price). The sequence of the algorithm implementation linked with the available wireless communication system is indicated in FIG. 6 and described as follows:

A vehicle enters the coverage area of the communication system and it receives a notification that there is a WPT service available in the area.

If the vehicle wants to interact, it will send a request for service to the grid side unit, otherwise it will ignore the notification.

Figure 6:
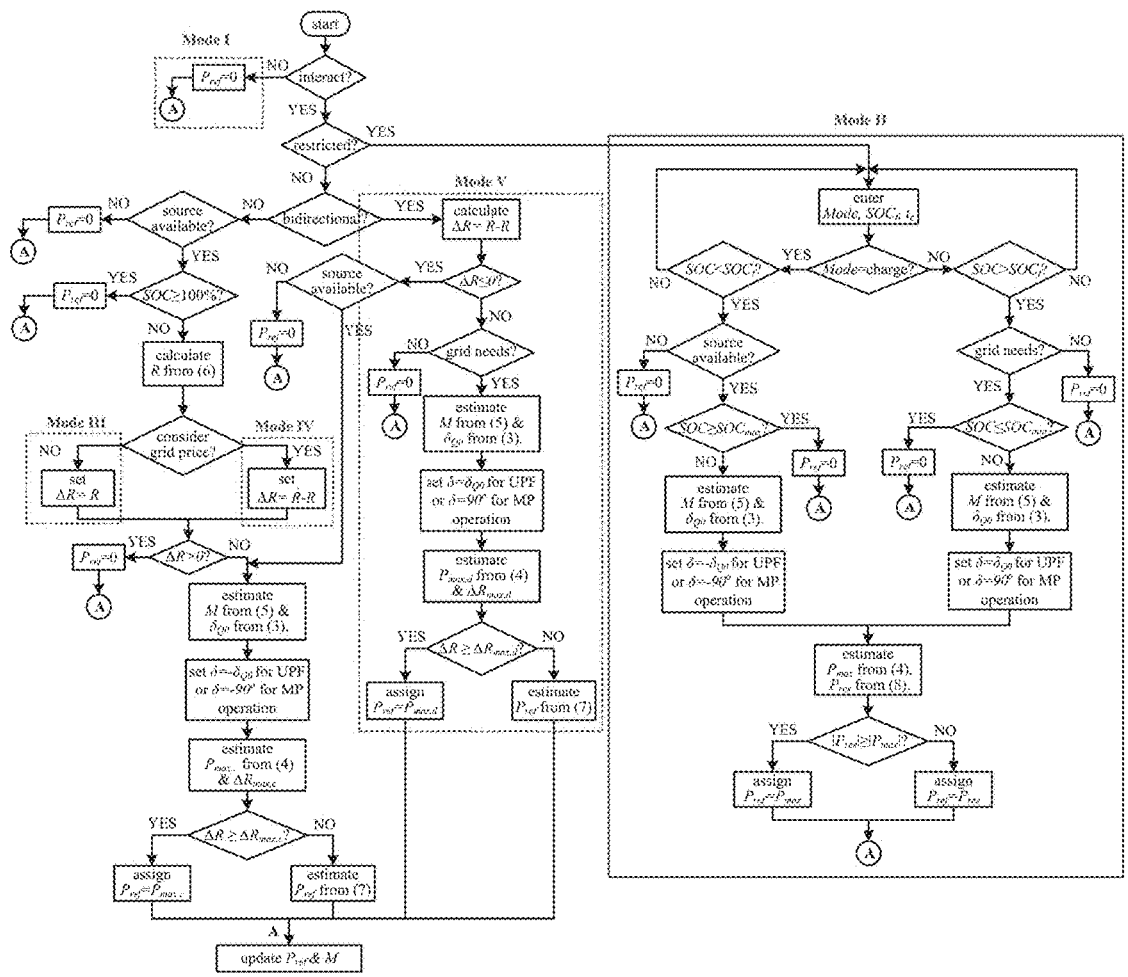
FIG. 6 shows an algorithm of a first layer controller of a two layer predictive controller according to an embodiment of the subject invention.

Based on the driver's desire, EV battery SOC, grid price and the BIWPTS specifications, the first layer controller checks the grid resources availability and decides the mode of operation and calculates $P_{ref}$ depending on FIG. 6.

The first layer controller passes the variables M and $P_{ref}$ to the second layer (PBPF) controller which predicts the PPM parameters ($\alpha$, $\beta$ and $\delta$).

Figure 7:
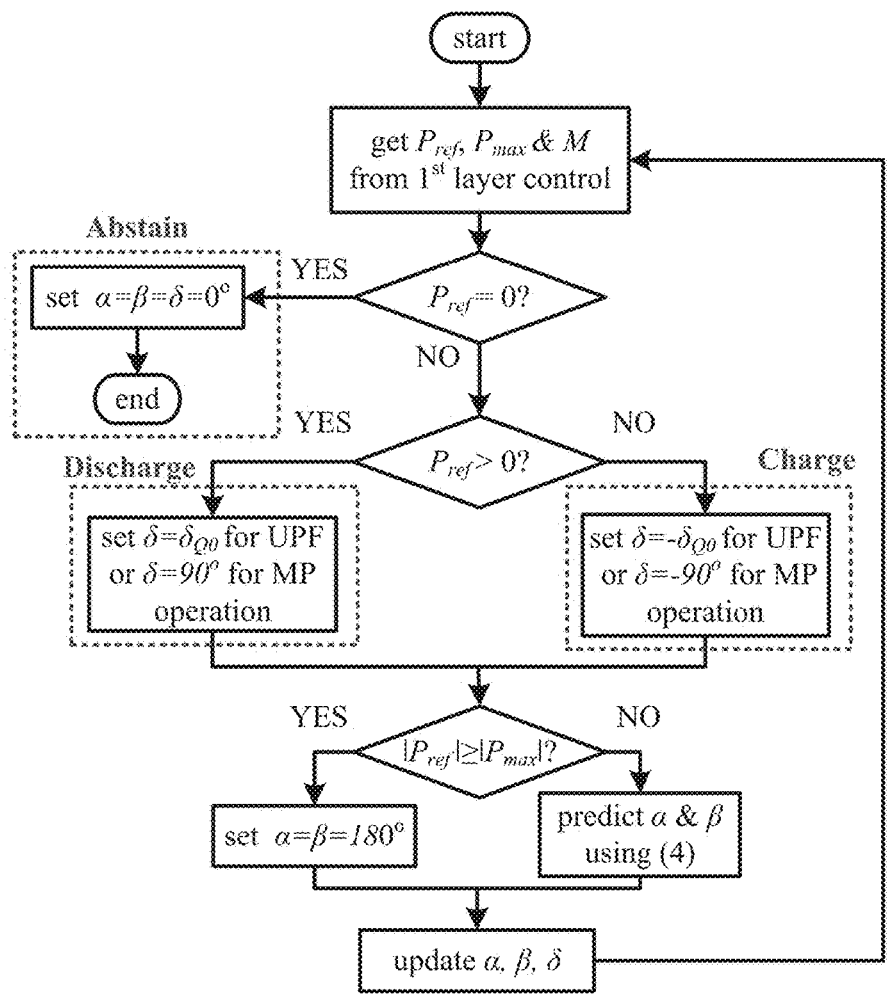
FIG. 7 shows an algorithm a second layer controller of a two layer predictive controller according to an embodiment of the subject invention.

The second layer controller 480 receives the reference active power $P_{ref}$ from the first layer controller 470, and predicts the modulation parameters ($\alpha$, $\beta$ and $\delta$) that direct the system to transfer this power. FIG. 7 shows an algorithm a second layer controller of a two layer predictive controller according to an embodiment of the subject invention and the operation procedure of this control layer. The second layer controller 480 gets M and $P_{ref}$ from the first layer controller 470 and checks the sign of $P_{ref}$. If $P_{ref}=0$, then the PPM parameters keep at zero there is no power transfer. This case can occur when there are limited resources, the grid does not need power, the driver does not want to sell energy while the EV fully charged or $\Delta R>0$, or the driver does not like to interact at all. On the other hand, if $P_{ref}$ is positive, the controller sets $\delta=\delta_{Q0}$ or 90° to discharge the battery and if it is negative, the controller assigns $\delta=-\delta_{Q0}$ or -90° for charging. The controller checks the charger limits $P_{max}$, if $P_{ref}$ is out of this limit then $\alpha$, $\beta$ will be set to the maximum, i.e. $\alpha=\beta=180°$, otherwise they will be estimated using (4). Finally, the controller updates the new parameters and passes $\delta$ and $\beta$ to the secondary PPM 450 and sends $\alpha$ to the primary PPM 250 through the wireless communication, as indicated in FIG. 2. Each of the primary and secondary PPMs generates the switching signals for both the primary and secondary inverters which are boosted through the driver's circuits to the gate voltage and power level of the semiconductor switch.

Figure 8:
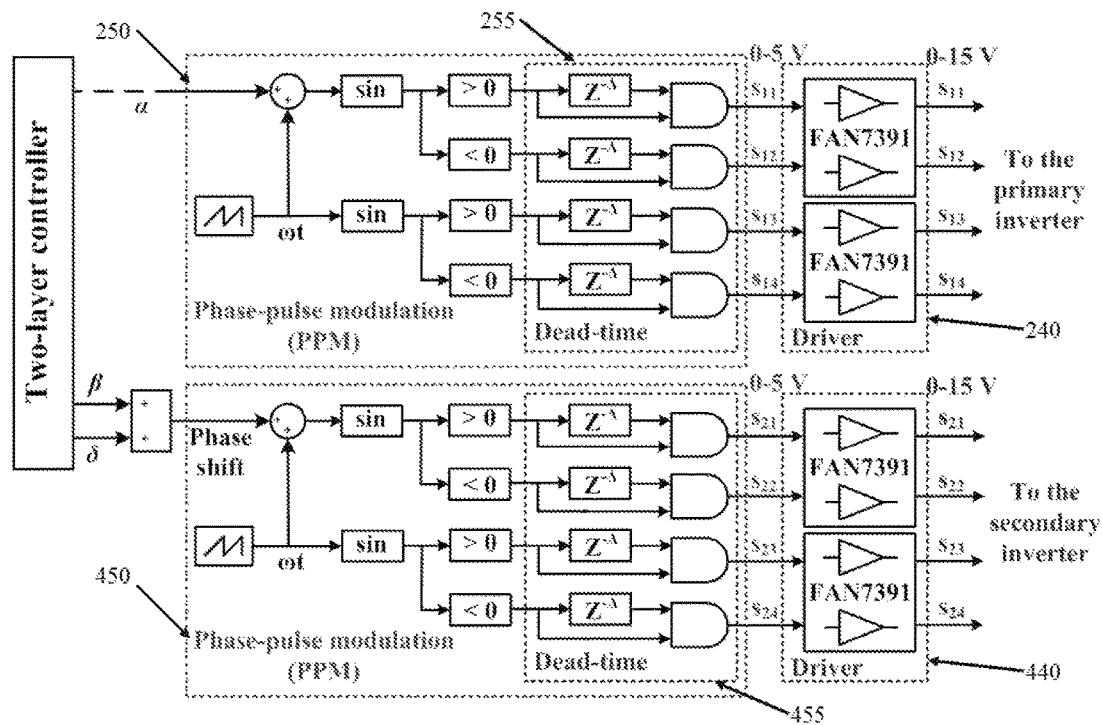
FIG. 8 shows a field-programmable gate array (FPGA) implementation of a pulse-phase modulator including a dead-time generator, and a driver according to an embodiment of the subject invention.

FIG. 8 shows a field-programmable gate array (FPGA) implementation of a pulse-phase modulator including a dead-time generator, and a driver according to an embodiment of the subject invention. The primary PPM 250 performs pulse-phase modulation based on the primary phase shift $\alpha$ and includes a primary dead time generator 255, thereby generating the primary switching signals $S_{11}$-$S_{14}$. The primary switching signals $S_{11}$-$S_{14}$ are boosted by the primary driver 240 and then provided to the primary switches of the primary inverter 210. The secondary PPM 450 performs pulse-phase modulation based on the secondary phase shift $\beta$ and differential phase shift $\delta$, and includes a secondary dead time generator 455, thereby generating the secondary switching signals $S_{21}$-$S_{24}$. The secondary switching signals $S_{21}$-$S_{24}$ are boosted by the secondary driver 440 and then provided to the secondary switches of the secondary inverter 410. Each of the primary 255 and secondary 455 dead time generators includes a logic AND gate for generating dead time, and each of the primary 240 and secondary 440 drivers includes a buffer for boosting the switching signals.

The subject invention includes, but is not limited to, the following exemplified embodiments.

Embodiment 1

A two layer predictive controller for bidirectional inductive power transfer, comprising:

a first layer controller generating a mutual inductance and a reference active power; and a second layer controller receiving the mutual inductance and the reference active power, and generating a primary phase shift, a secondary phase shift, and a differential phase shift, the primary phase shift configured to manage a magnitude of an output voltage of a primary inverter, the secondary phase shift configured to manage a magnitude of an output voltage of a secondary inverter, and the differential phase shift being a phase difference between the output voltage of the primary inverter and the output voltage of the secondary inverter.

Embodiment 2

The two layer predictive controller according to embodiment 1, further comprising a secondary pulse-phase modulator receiving the secondary phase shift and the differential phase shift, and generating a secondary switching signal for the secondary inverter.

Embodiment 3

The two layer predictive controller according to any of embodiments 1-2, the first layer controller receiving at least one of a battery management system data, an EV operator's desire, and an open circuit voltage of a secondary side circuit including the secondary inverter.

Embodiment 4

The two layer predictive controller according to any of embodiments 1-3, further comprising a secondary communication gateway receiving an information from a primary side circuit including the primary inverter and providing the information to the first layer controller.

Embodiment 5

The two layer predictive controller according to embodiment 4, the first layer controller receiving the primary phase shift from the second layer controller and providing the primary phase shift to the secondary communication gateway.

Embodiment 6

The two layer predictive controller according to any of embodiments 4-5, the secondary communication gateway providing the primary phase shift to the primary side circuit through wireless communication.

Embodiment 7

The two layer predictive controller according to any of embodiments 4-6, the information including a retail price and data about a charging station.

Embodiment 8

The two layer predictive controller according to any of embodiments 1-7, the second layer controller setting the differential phase shift at zero such that there is no power transfer between the primary side circuit and the secondary side circuit when the reference active power is zero; the second layer controller setting the differential phase shift at $-90°$ or $-\delta_{Q0}$ for charging when the reference active power is negative; and the second layer controller setting the differential phase shift at $90°$ or $\delta_{Q0}$ for discharging when the reference active power is positive.

Embodiment 9

The two layer predictive controller according to any of embodiments 1-9, the second layer controller setting the primary phase shift and the secondary phase shift to a maximum value of $180°$ when the reference active power is out of a limit.

Embodiment 10

The two layer predictive controller according to any of embodiments 2-9, further comprising secondary driver receiving the secondary switching signal from the secondary pulse-phase modulator, boosting the secondary switching signal, and providing the boosted secondary switching signal to the secondary inverter.

Embodiment 11

A two layer predictive controller for bidirectional inductive power transfer, comprising:

a first layer controller generating a mutual inductance and a reference active power;

a second layer controller receiving the mutual inductance and the reference active power, and generating a primary phase shift, a secondary phase shift, and a differential phase shift; and a secondary pulse-phase modulator receiving the secondary phase shift and the differential phase shift, and generating a secondary switching signal for a secondary inverter of a secondary side circuit, the mutual inductance estimated by the first layer controller based on a primary coil current of a primary side circuit and an open circuit voltage of the secondary side circuit, the primary phase shift configured to manage a magnitude of an output voltage of a primary inverter of the primary side circuit, the secondary phase shift configured to manage a magnitude of an output voltage of the secondary inverter, and the differential phase shift being a phase difference between the output voltage of the primary inverter and the output voltage of the secondary inverter.

Embodiment 12

The two layer predictive controller according to embodiment 11, the reference active power estimated by the first layer controller based on a difference between a charger retail price and a psychological price of a user of the secondary side circuit.

Embodiment 13

The two layer predictive controller according to embodiment 12, the first layer controller generating the reference active power representing a discharging mode of the secondary side circuit when the charger retail price is higher than the psychological price, and the first layer controller generating the reference active power representing a charging mode of the secondary side circuit when the charger retail price is lower than the psychological price.

Embodiment 14

The two layer predictive controller according to any of embodiments 11-13, further comprising a secondary communication gateway receiving the primary phase shift from the second layer controller through the first layer controller, and providing the primary phase shift to the primary side circuit.

Embodiment 15

The two layer predictive controller according to any of embodiments 11-14, the first layer controller receiving a battery management system data, an EV operator's desire, and the open circuit voltage of the secondary side circuit.

Embodiment 16

The two layer predictive controller according to any of embodiments 11-15, further comprising a primary pulse-phase modulator receiving the primary phase shift and generating a primary switching signal for the primary inverter.

Embodiment 17

The two layer predictive controller according to embodiment 16, further comprising a primary communication gateway receiving the primary phase shift from the secondary communication gateway through wireless communication and providing the primary phase shift to the primary pulse-phase modulator.

Embodiment 18

The two layer predictive controller according to any of embodiments 11-17, further comprising a primary driver receiving the primary switching signal, boosting the primary switching signal, and providing the boosted primary switching signal to the primary inverter; and a secondary driver receiving the secondary switching signal, boosting the secondary switching signal, and providing the boosted secondary switching signal to the secondary inverter.

Embodiment 19

The two layer predictive controller according to any of embodiments 11-18, the second layer controller setting the differential phase shift at zero such that there is no power transfer between the primary side circuit and the secondary side circuit when the reference active power is zero; the second layer controller setting the differential phase shift at −90° for charging at maximum power when the reference active power is negative; the second layer controller setting the differential phase shift at −$\delta_{Qo}$ for charging at unity power factor when the reference active power is negative; the second layer controller setting the differential phase shift at 90° for discharging at maximum power when the reference active power is positive; and the second layer controller setting the differential phase shift at $\delta_{Qo}$ for discharging at unity power factor when the reference active power is positive.

Embodiment 20

A two layer predictive controller system for bidirectional inductive power transfer, comprising:

a primary inverter;
a secondary inverter;
a wireless coupler coupling the primary inverter and the secondary inverter such that inductive power transfers bidirectionally between the primary inverter and the secondary inverter;
a first layer controller generating a mutual inductance of the wireless coupler and a reference active power;
a second layer controller receiving the mutual inductance and the reference active power, and generating a primary phase shift, a secondary phase shift, and a differential phase shift;
a secondary pulse-phase modulator receiving the secondary phase shift and the differential phase shift, and generating a secondary switching signal;
a secondary driver receiving the secondary switching signal, boosting the secondary switching signal, and providing the boosted secondary switching signal to the secondary inverter;
a secondary communication gateway receiving the primary phase shift from the second layer controller through the first layer controller;
a primary communication gateway receiving the primary phase shift from the secondary communication gateway through wireless communication;
a primary pulse-phase modulator receiving the primary phase shift from the primary communication gateway and generating a primary switching signal for a primary inverter; and
a primary driver receiving the primary switching signal, boosting the primary switching signal, and providing the boosted primary switching signal to the primary inverter,
the primary phase shift configured to manage a magnitude of an output voltage of the primary inverter,
the secondary phase shift configured to manage a magnitude of an output voltage of the secondary inverter,
the differential phase shift being a phase difference between the output voltage of the primary inverter and the output voltage of the secondary inverter, and the second layer controller setting the differential phase shift at zero such that there is no power transfer between the primary side circuit and the secondary side circuit when the reference active power is zero; the second layer controller setting the differential phase shift at −90° for charging at maximum power when the reference active power is negative; the second layer controller setting the differential phase shift at −$\delta_{Qo}$ for charging at unity power factor when the reference active power is negative; the second layer controller setting the differential phase shift at 90° for discharging at maximum power when the reference active power is positive; and the second layer controller setting the differential phase shift at $\delta_{Qo}$ for discharging at unity power factor when the reference active power is positive.

Embodiment 21

The two layer predictive controller according to embodiment 11, the first layer controller providing five different options for the EV's operator to choose among, the five options comprising:

Mode I—abstain (no interaction);
Mode II—restricted operation by manually entering Mode, SOCf and tc;
Mode III—charge only without considering the grid price;
Mode IV—charge only with considering the grid price; and Mode V—interact (charge and discharge based on the grid price and EV psychological price).

A greater understanding of the present invention and of its many advantages may be had from the following example, given by way of illustration. The following example is illustrative of some of the methods, applications, embodiments, and variants of the present invention. It is, of course, not to be considered as limiting the invention. Numerous changes and modifications can be made with respect to the invention.

Example 1

Figure 9:
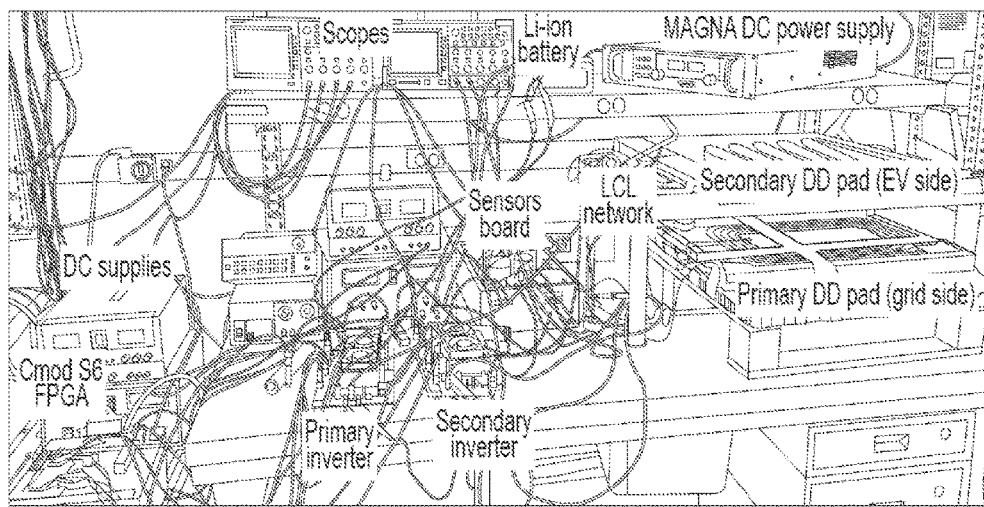
FIG. 9 shows a setup for test of a two layer predictive controller according to an embodiment of the subject invention.

A LCL bidirectional IPT system for EV applications driven by the two layer controller according to an embodiment of the subject invention was analyzed by means of simulation and experimental tests. The two layer controller was implemented using Cmod S6 FPGA board. The entire system setup is shown in FIG. 9. The two system's sides are symmetrical, and each side comprises a HF H-bridge inverter, a double-D power pad, an L-filter, and a compensation capacitor. A Li-ion battery module was used to emulate EV's performance, and a DC supply in parallel with a resistive load was used to behave as a DC bus. Hall-effect sensors and digital scopes were utilized for data acquisition.

FIG. 10(a) shows an open circuit voltage of a secondary side circuit and a primary coil current of a primary side circuit, and FIG. 10(b) shows an estimated mutual inductance and a measured mutual inductance. Referring to FIGS. 10(a) and 10(b), the parameter δ is set for 180° and the open circuit voltage $E_s$ is measured, as indicated by the green dashed line. The primary coil current is calculated using Equation (2) and also measured for verification purpose. As can be seen in FIG. 10(a), the estimated and the measured values have good agreement. Depending on Equation (3), the mutual inductance is estimated and compared with the real actual value in FIG. 10(b). It can be noted that the embodiment of the subject invention could reach to the correct M in less than 5 msec, which confirm its accuracy and practicality.

After confirming the system model and the parameter estimation, the PBPF controller is enforced and tested in this section. The BIWPTS performance during abstain and discharging operation is described in FIG. 11. FIGS. 11(a)-11(d) show control parameters, secondary power, secondary voltage, and enlarged secondary voltage of a two layer predictive controller under Abstain and Discharge modes. Referring to FIGS. 11(a)-11(d), the system starts with the Abstain mode and switches to the Discharge mode at 0.04 second. During the Abstain mode, all the control parameters are set to zero and no power flow occurs. In the wake of applying Discharge mode, δ is changed in accordance with 90° to accomplish V2G services with maximum power rating, and α and β are set to match with the desired power ($P_{ref}$), as shown in FIGS. 11(a) and (b). At 0.08 second, $P_{ref}$ exceeds the power limits, accordingly the controller conforms α and β to 180° to give the maximum available power. Then, at 0.12 second, the required power diminishes and the control framework takes after the new value. During these transitions of power flow, the variation of $V_{si}$ can be seen in FIGS. 11(c) and (d).

The execution of the controller of the subject invention is compared with the classical proportional integral (PI) controller as delineated in FIG. 12. FIG. 12 shows comparison between a proportional-integral (PI) controller and a two layer predictive controller under the Abstain and Discharge modes. The FIG. 12 demonstrates the reference active power of the actual system power using PI and the PBPF controller. During the Abstain mode, the PI controller couldn't keep the power at zero which prompts to unwanted inverters switching. Additionally, it shows noisy performance during both the transient and steady state response. Also, a large delay is experienced in the PI transient response (at 0.12 second). On the other hand, the controller of the subject invention gives more precise and faster tracking for the reference power.

FIGS. 13(a)-13(d) show control parameters, secondary power, secondary voltage, and enlarged secondary voltage of a two layer predictive controller under Discharge and Charge modes according to an embodiment of the subject invention. Referring to FIGS. 13(a)-13(d), the controller changes the framework from Discharge (V2G) to Charge (G2V) operation at 0.06 second by changing δ from 90° to −90°. As a result of δ variation, the power flow is reversed from positive to negative following the new reference. The system remains working in the Charge mode during the rest of the time with various power level. The secondary voltage varies due to the control actions, as shown in FIGS. 13(c) and (d). During the whole time of operation, the controller successfully follows the reference value and the system transfers the required power.

Figure 14:
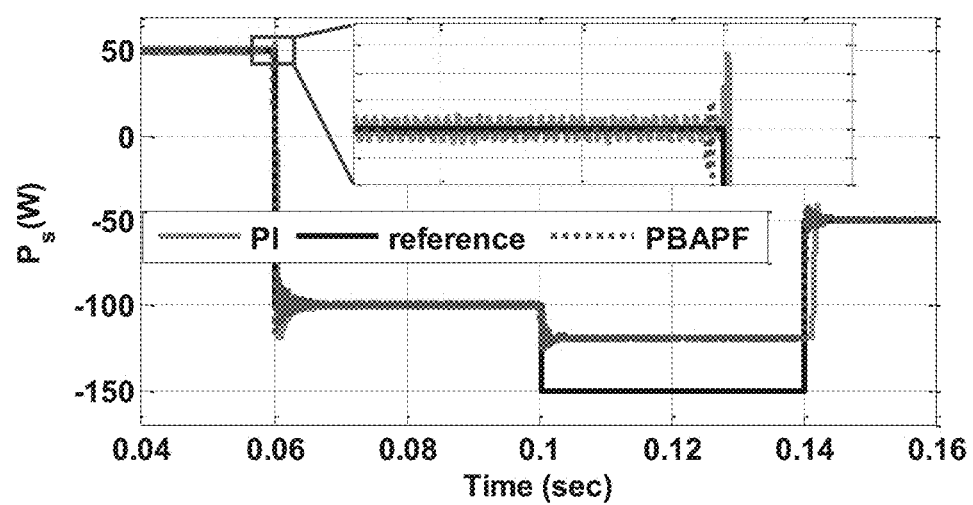
FIG. 14 shows comparison between a PI controller and a two layer predictive controller under Discharge and Charge.

FIG. 14 shows comparison between a PI controller and a two layer predictive controller under Discharge and Charge modes. Referring to FIG. 14, the controller demonstrates fast transient response with accurate steady state attitude compared with the PI controller.

A two-layer vehicle side predictive active power flow controller for BIWPTS in V2G applications is suitable for stationary and quasi-dynamic interaction between EV and the power grid. It allows the EV's drivers to choose between 5 different modes of operation. Also, it considers the grid retail price to achieve the maximum profits for the EV owners. The two layer controller is based on the system modeling and it has the ability to predict the modulation parameters for both the primary and secondary inverters to achieve the required power flow. Moreover, it considers the misalignment in WPT system by adaptively estimating the mutual inductance before applying the proposed algorithm. This controller shows accurate and fast performance during both the transient and steady state operation compared to the available controller in literature.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] M. J. Neath, U. K. Madawala, and D. J. Thrimawithana, "A new controller for bidirectional inductive power transfer systems," in 2011 IEEE International Symposium on Industrial Electronics (ISIE), 2011, pp. 1951-1956.

[2] U. K. Madawala, M. Neath, and D. J. Thrimawithana, "A Power #x2013; Frequency Controller for Bidirectional Inductive Power Transfer Systems," IEEE Trans. Ind. Electron., vol. 60, no. 1, pp. 310-317, January 2013.

[3] M. J. Neath, A. K. Swain, U. K. Madawala, and D. J. Thrimawithana, "An Optimal PID Controller for a Bidirectional Inductive Power Transfer System Using Multi-objective Genetic Algorithm," IEEE Trans. Power Electron., vol. 29, no. 3, pp. 1523-1531, March 2014.

[4] K. Thirugnanam, T. P. E. R. Joy, M. Singh, and P. Kumar, "Modeling and Control of Contactless Based Smart Charging Station in V2G Scenario," IEEE Trans. Smart Grid, vol. 5, no. 1, pp. 337-348, January 2014.

[5] A. A. S. Mohamed, A. Berzoy, and O. Mohammed, "Experimental Validation of Comprehensive Steady-state Analytical Model of Bidirectional WPT System in EVs Applications," IEEE Trans. Veh. Technol.

[6] M. Budhia, G. A. Covic, and J. T. Boys, "Design and Optimization of Circular Magnetic Structures for Lumped Inductive Power Transfer Systems," IEEE Trans. Power Electron., vol. 26, no. 11, pp. 3096-3108, November 2011.

[7] C. H. Ou, H. Liang, and W. Zhuang, "Investigating Wireless Charging and Mobility of Electric Vehicles on Electricity Market," IEEE Trans. Ind. Electron., vol. 62, no. 5, pp. 3123-3133, May 2015.

[8] R. Xiong, H. He, F. Sun, and K. Zhao, "Evaluation on State of Charge Estimation of Batteries With Adaptive Extended Kalman Filter by Experiment Approach," IEEE Trans. Veh. Technol., vol. 62, no. 1, pp. 108-117, January 2013.

[9] C. R. Lashway and 0. A. Mohammed, "Adaptive Battery Management and Parameter Estimation Through Physics-Based Modeling and Experimental Verification," IEEE Trans. Transp. Electrification, vol. 2, no. 4, pp. 454-464, December 2016.

What is claimed is:

1. A two layer predictive controller for bidirectional inductive power transfer, comprising:
   a first layer controller generating a mutual inductance and a reference active power; and
   a second layer controller receiving the mutual inductance and the reference active power, and generating a primary phase shift, a secondary phase shift, and a differential phase shift,
   the primary phase shift configured to manage a magnitude of an output voltage of a primary inverter,
   the secondary phase shift configured to manage a magnitude of an output voltage of a secondary inverter, and
   the differential phase shift being a phase difference between the output voltage of the primary inverter and the output voltage of the secondary inverter.

2. The two layer predictive controller according to claim 1, further comprising a secondary pulse-phase modulator receiving the secondary phase shift and the differential phase shift, and generating a secondary switching signal for the secondary inverter.

3. The two layer predictive controller according to claim 2, the first layer controller receiving at least one of a battery management system data, an EV operator's desire, and an open circuit voltage of a secondary side circuit including the secondary inverter.

4. The two layer predictive controller according to claim 3, further comprising a secondary communication gateway receiving an information from a primary side circuit including the primary inverter and providing the information to the first layer controller.

5. The two layer predictive controller according to claim 4, the first layer controller receiving the primary phase shift from the second layer controller and providing the primary phase shift to the secondary communication gateway.

6. The two layer predictive controller according to claim 5, the secondary communication gateway providing the primary phase shift to the primary side circuit through wireless communication.

7. The two layer predictive controller according to claim 6, the information including a retail price and data about a charging station.

8. The two layer predictive controller according to claim 6, the second layer controller setting the differential phase shift at zero such that there is no power transfer between the primary side circuit and the secondary side circuit when the reference active power is zero; the second layer controller setting the differential phase shift at $-90°$ for charging at maximum power when the reference active power is negative; the second layer controller setting the differential phase shift at $-\delta_{Q0}$ for charging at unity power factor when the reference active power is negative; the second layer controller setting the differential phase shift at $90°$ for discharging at maximum power when the reference active power is positive; and the second layer controller setting the differential phase shift at $\delta_{Q0}$ for discharging at unity power factor when the reference active power is positive.

9. The two layer predictive controller according to claim 6, the second layer controller setting the primary phase shift and the secondary phase shift to a maximum value of $180°$ when the reference active power is out of a limit.

10. The two layer predictive controller according to claim 6, further comprising secondary driver receiving the secondary switching signal from the secondary pulse-phase modulator, boosting the secondary switching signal, and providing the boosted secondary switching signal to the secondary inverter.

11. A two layer predictive controller for bidirectional inductive power transfer comprising:
    a first layer controller generating a mutual inductance and a reference active power;
    a second layer controller receiving the mutual inductance and the reference active power, and generating a primary phase shift, a secondary phase shift, and a differential phase shift; and
    a secondary pulse-phase modulator receiving the secondary phase shift and the differential phase shift, and generating a secondary switching signal for a secondary inverter of a secondary side circuit,
    the mutual inductance estimated by the first layer controller based on an estimated primary coil current of a primary side circuit and a measured open circuit voltage of the secondary side circuit,
    the primary phase shift configured to manage a magnitude of an output voltage of a primary inverter of the primary side circuit,
    the secondary phase shift configured to manage a magnitude of an output voltage of the secondary inverter, and
    the differential phase shift being a phase difference between the output voltage of the primary inverter and the output voltage of the secondary inverter.

12. The two layer predictive controller according to claim 11, the reference active power estimated by the first layer controller based on a charger retail price, an EV's psychological price of a user of the secondary side circuit, and the EV's operator desire.

13. The two layer predictive controller according to claim 12, the first layer controller generating the reference active power representing a discharging mode of the secondary side circuit when the charger retail price is higher than the psychological price, and the first layer controller generating the reference active power representing a charging mode of the secondary side circuit when the charger retail price is lower than the psychological price.

14. The two layer predictive controller according to claim 13, further comprising a secondary communication gateway receiving the primary phase shift from the second layer controller through the first layer controller, and providing the primary phase shift to the primary side circuit.

15. The two layer predictive controller according to claim 14, the first layer controller receiving a battery management system data, an owner's desire, and the open circuit voltage of the secondary side circuit.

16. The two layer predictive controller according to claim 15, further comprising a primary pulse-phase modulator receiving the primary phase shift and generating a primary switching signal for the primary inverter.

17. The two layer predictive controller according to claim 16, further comprising a primary communication gateway receiving the primary phase shift from the secondary communication gateway through wireless communication and providing the primary phase shift to the primary pulse-phase modulator.

18. The two layer predictive controller according to claim 17, further comprising a primary driver receiving the primary switching signal, boosting the primary switching signal, and providing the boosted primary switching signal to the primary inverter; and a secondary driver receiving the secondary switching signal, boosting the secondary switching signal, and providing the boosted secondary switching signal to the secondary inverter.

19. The two layer predictive controller according to claim 18, the second layer controller setting the differential phase shift at zero such that there is no power transfer between the primary side circuit and the secondary side circuit when the reference active power is zero; the second layer controller setting the differential phase shift at −90° for charging at maximum power when the reference active power is negative; the second layer controller setting the differential phase shift at $-\delta_{Q0}$ for charging at unity power factor when the reference active power is negative; the second layer controller setting the differential phase shift at 90° for discharging at maximum power when the reference active power is positive; and the second layer controller setting the differential phase shift at $\delta_{Q0}$ for discharging at unity power factor when the reference active power is positive.

20. A two layer predictive controller system for bidirectional inductive power transfer, comprising:
   a primary inverter;
   a secondary inverter;
   a wireless coupler coupling the primary inverter and the secondary inverter such that inductive power transfers bidirectionally between the primary inverter and the secondary inverter;
   a first layer controller generating a mutual inductance of the wireless coupler and a reference active power;
   a second layer controller receiving the mutual inductance and the reference active power, and generating a primary phase shift, a secondary phase shift, and a differential phase shift;
   a secondary pulse-phase modulator receiving the secondary phase shift and the differential phase shift, and generating a secondary switching signal;
   a secondary driver receiving the secondary switching signal, boosting the secondary switching signal, and providing the boosted secondary switching signal to the secondary inverter;
   a secondary communication gateway receiving the primary phase shift from the second layer controller through the first layer controller;
   a primary communication gateway receiving the primary phase shift from the secondary communication gateway through wireless communication;
   a primary pulse-phase modulator receiving the primary phase shift from the primary communication gateway and generating a primary switching signal for a primary inverter; and
   a primary driver receiving the primary switching signal, boosting the primary switching signal, and providing the boosted primary switching signal to the primary inverter,
   the primary phase shift configured to manage a magnitude of an output voltage of the primary inverter,
   the secondary phase shift configured to manage a magnitude of an output voltage of the secondary inverter,
   the differential phase shift being a phase difference between the output voltage of the primary inverter and the output voltage of the secondary inverter, and
   the second layer controller setting the differential phase shift at zero such that there is no power transfer between the primary side circuit and the secondary side circuit when the reference active power is zero; the second layer controller setting the differential phase shift at −90° for charging at maximum power when the reference active power is negative; the second layer controller setting the differential phase shift at $-\delta_{Q0}$ for charging at unity power factor when the reference active power is negative; the second layer controller setting the differential phase shift at 90° for discharging at maximum power when the reference active power is positive; and the second layer controller setting the differential phase shift at $\delta_{Q0}$ for discharging at unity power factor when the reference active power is positive.

* * * * *